United States Patent
Otsu et al.

(10) Patent No.: US 11,365,484 B2
(45) Date of Patent: Jun. 21, 2022

(54) CHAMBER FRAME ELEMENT, ELECTROLYZER, AND ELECTRODIALYSIS CELL

(71) Applicant: DE NORA PERMELEC LTD., Fujisawa (JP)

(72) Inventors: Hideo Otsu, Fujisawa (JP); Makoto Okura, Fujisawa (JP)

(73) Assignee: DE NORA PERMELEC LTD., Fujisawa (JP)

( * ) Notice: Subject to any disclaimer, the term of this patent is extended or adjusted under 35 U.S.C. 154(b) by 0 days.

(21) Appl. No.: 17/424,445

(22) PCT Filed: Jan. 17, 2020

(86) PCT No.: PCT/JP2020/001595
§ 371 (c)(1),
(2) Date: Jul. 20, 2021

(87) PCT Pub. No.: WO2020/153273
PCT Pub. Date: Jul. 30, 2020

(65) Prior Publication Data
US 2022/0074058 A1 Mar. 10, 2022

(30) Foreign Application Priority Data
Jan. 21, 2019 (JP) ............................. JP2019-008075

(51) Int. Cl.
*C25B 9/63* (2021.01)
*C25B 13/00* (2006.01)
(Continued)

(52) U.S. Cl.
CPC ................ *C25B 9/63* (2021.01); *B01D 61/46* (2013.01); *C02F 1/46104* (2013.01); *C25B 9/21* (2021.01);
(Continued)

(58) Field of Classification Search
CPC ....... C25B 9/21; C02F 1/46104; C02F 1/4693
(Continued)

(56) References Cited

U.S. PATENT DOCUMENTS 4,417,970 A  11/1983 Yamaguchi et al.
4,851,099 A   7/1989 Brereton
(Continued)

FOREIGN PATENT DOCUMENTS

CN   87 2 08091 U   12/1987
CN      1865521 A   11/2006
(Continued)

OTHER PUBLICATIONS

Chinese Office Action and Search Report for Chinese Application No. 202080008671.6, dated Nov. 29, 2021.
(Continued)

*Primary Examiner* — Brian W Cohen
(74) *Attorney, Agent, or Firm* — Birch, Stewart, Kolasch & Birch, LLP

(57) ABSTRACT

The chamber frame element of the present invention, which has a smaller amount of voltage drop, consumes less reactive power than the prior art, and exhibits no metal corrosion, is a chamber frame element (14) for an electrolyzer or an electrodialysis cell. The chamber frame element (14) includes: a bag body (141); a frame (142) housed in an interior space of the bag body (141); and an inlet (143) and an outlet (144) to which piping can be attached, which are formed on the outer side of a region where the frame is housed in the bag body (141).

15 Claims, 6 Drawing Sheets

(51) Int. Cl.
*B01D 61/46* (2006.01)
*C25B 11/036* (2021.01)
*C25B 9/23* (2021.01)
*C25B 9/21* (2021.01)
*C02F 1/461* (2006.01)
*C02F 1/469* (2006.01)

(52) U.S. Cl.
CPC ............... *C25B 9/23* (2021.01); *C25B 11/036* (2021.01); *C25B 13/00* (2013.01); *C02F 1/4693* (2013.01)

(58) Field of Classification Search
USPC ............................................. 204/297.01, 279
See application file for complete search history.

(56) References Cited

U.S. PATENT DOCUMENTS

| | | | |
|---|---|---|---|
| 6,391,170 B1 * | 5/2002 | Day | C25C 7/02 204/286.1 |
| 2005/0178427 A1 | 8/2005 | Kelly et al. | |
| 2006/0249377 A1 | 11/2006 | Koops et al. | |
| 2008/0169188 A1 | 7/2008 | Gil et al. | |
| 2014/0034485 A1 | 2/2014 | Krebs et al. | |
| 2015/0376036 A1 * | 12/2015 | Kedem | B01J 47/12 204/520 |
| 2016/0346737 A1 * | 12/2016 | Liang | B01D 61/48 |

FOREIGN PATENT DOCUMENTS

| | | |
|---|---|---|
| CN | 102121113 A | 7/2011 |
| CN | 103409772 A | 11/2013 |
| CN | 103633397 A | 3/2014 |
| JP | 2007-526948 A | 9/2007 |
| JP | 2015-182008 A | 10/2015 |
| JP | 2017-56376 A | 3/2017 |
| KR | 10-0790680 B1 | 1/2008 |
| WO | WO 2018/136337 A2 | 7/2018 |

OTHER PUBLICATIONS

Korean Office Action for Korean Application No. 10-2021-7026060, dated Oct. 1, 2021.
Decision to Grant a Patent issued in Japanese Patent Application No. 2019-008075 drafted Sep. 28, 2020.
International Search Report for PCT/JP2020/001595 (PCT/ISA/210) dated Mar. 10, 2020.
Notice of Reasons for Refusal issued in Japanese Patent Application No. 2019-008075 drafted Jun. 12, 2020.
Written Opinion of the International Searching Authority for PCT/JP2020/001595 (PCT/ISA/237) dated Mar. 10, 2020.

* cited by examiner

CHAMBER FRAME ELEMENT, ELECTROLYZER, AND ELECTRODIALYSIS CELL

TECHNICAL FIELD

The present invention relates to: a chamber frame element for an electrolyzer; and an electrolyzer and an electrodialysis cell, which include the chamber frame element.

BACKGROUND ART

Three-chamber electrolysis and the like are used in salt separation processes, lithium hydroxide production processes, organic electrolysis processes, hypochlorous acid production processes and the like. A three-chamber electrolyzer has, as a basic structure, a unit cell including an anode chamber, an intermediate chamber and a cathode chamber, in which an anode is housed in the anode chamber, a cathode is housed in the cathode chamber, the anode chamber and the intermediate chamber are separated by an anion exchange membrane in an anion-permeable manner, and the cathode chamber and the intermediate chamber are separated by a cation exchange membrane in a cation-permeable manner (Patent Document 1).

A conventional intermediate chamber of such a three-chamber electrolyzer is an element which generally includes a metal-made frame, and in which a liquid inlet and a liquid outlet are arranged on this frame and an electrolyte solution can be circulated inside the frame through the inlet and the outlet.

In addition to the three-chamber electrolyzers, there are two-chamber electrolyzers that include an anode chamber in which an anode is arranged, a cathode chamber in which a cathode is arranged, and an ion exchange membrane arranged as a diaphragm between the anode chamber and the cathode chamber. As one of such two-chamber electrolyzers, a two-chamber electrolyzer in which unit cells, each of which is constituted by: a bipolar electrode having an anode arranged on one side of a membrane and a cathode arranged on the other side of the membrane; an anode chamber arranged on the anode side of the bipolar electrode; and a cathode chamber arranged on the cathode side of the bipolar electrode, are sequentially disposed with an ion exchange membrane being arranged as a diaphragm between each anode chamber and cathode chamber is used in some cases. Alternatively, depending on the electrolysis process, a single-chamber electrolyzer having no diaphragm (diaphragm-free single-chamber electrolyzer), in which an electrolysis chamber is arranged on the anode side of the above-described bipolar electrode and another electrolysis chamber is arranged on the cathode side of the bipolar electrode, may be used. A metal-made frame is also used in the electrolysis chambers (the general term "electrolysis chamber" used herein encompasses an anode chamber, a cathode chamber, and an intermediate chamber) of these single-chamber and two-chamber electrolyzers.

Further, there are some electrolysis chambers that include an element constituted by a frame made of a resin rather than a metal.

Moreover, a metal-made frame is also used in electrodialysis cells that perform electrodialysis.

RELATED ART DOCUMENT

Patent Document

[Patent Document 1] JP2015-182008A

SUMMARY OF THE INVENTION

Problems to be Solved by the Invention

In an electrolysis chamber of a conventional electrolyzer, for example, for connecting a manifold to the inlet and the outlet that are arranged on the frame, the frame is required to have a certain thickness, i.e. a certain dimension in the respective directions toward the electrodes of the anode chamber and the cathode chamber in the case of an intermediate chamber of a three-chamber electrolyzer. During an electrolysis treatment, the frame thickness of this electrolysis chamber causes a drop in the voltage that is applied between the anode of the anode chamber adjacent to the electrolysis chamber and the cathode of the cathode chamber adjacent to the electrolysis chamber. The amount of this voltage drop directly relates to the power consumption during electrolysis. Further, since the voltage drop induces heating of an electrolyte solution in the electrolysis chamber, a greater amount of voltage drop leads to an increase in the consumption of energy for cooling. Accordingly, it is desired to inhibit such a voltage drop as much as possible; however, the inhibition of a voltage drop is limited due to the above-described frame thickness.

Further, since the frame of an electrolysis chamber of a conventional electrolyzer is made of a metal, a leakage current occurs between the frame and a ground during electrolysis, and this causes corrosion of the metal. Accordingly, as a countermeasure against the metal corrosion, a sacrificial electrode is arranged in the electrolyzer in such a manner that it is electrically connected to the frame of the electrolysis chamber or a metal casing welded to the frame. However, despite that the sacrificial electrode needs to be replaced regularly, the sacrificial electrode is welded to an equipment of the electrolyzer and thus not easily replaceable, which requires a work cost for the replacement and a material cost of the sacrificial electrode itself.

In the case of an electrolysis chamber constituted by a resin element, metal corrosion of the electrolysis chamber caused by a leakage current is not an issue; however, an electrolyte solution is circulated between the electrolysis chamber and the outside through a manifold arranged inside the electrolysis chamber. Accordingly, for the formation of the manifold, a flow path that penetrates all elements is required in an electrolyzer in which plural unit cells are arranged. In addition, in an element having a structure in which a manifold is arranged inside an electrolysis chamber, the distance with its adjacent element is generally close; therefore, the consumption of reactive power increases due to a larger bypass current.

The present invention was made in view of the above-described problems, and an object of the present invention is to provide: a chamber frame element having a smaller amount of voltage drop and less consumption of reactive power than the prior art; and an electrolyzer and an electrodialysis cell including the chamber frame element.

Means for Solving the Problems

A first aspect of the present invention is a chamber frame element for an electrolyzer or an electrodialysis cell, the chamber frame element is characterized by including: a bag body; a frame housed in an interior space of the bag body; and an inlet and an outlet to which piping can be attached, the inlet and the outlet being formed on the outer side of a region where the frame is housed in the bag body.

In the first aspect of the present invention, it is preferred that the chamber frame element be made of a resin.

In the first aspect of the present invention, it is also preferred that the frame includes a flow path that allows a liquid inflowing from the inlet to flow inside the frame and a liquid inside the frame to flow to the outlet. This flow path may be a groove or a channel that communicates to the outside and the inside of the frame, or the frame may be formed of a porous material.

Further, in the first aspect of the present invention, the chamber frame element is preferably a chamber frame element for a three-chamber electrolyzer.

A second aspect of the present invention is an electrolyzer including the chamber frame element of the first aspect.

A third aspect of the present invention is an electrodialysis cell including the chamber frame element of the first aspect.

Effects of the Invention

According to the present invention, an intermediate chamber can be reduced in thickness, and the amount of voltage drop during electrolysis can be reduced. In addition, since a manifold is not arranged inside an electrolysis chamber, a bypass current is small, and the consumption of reactive power is limited.

MODE FOR CARRYING OUT THE INVENTION

Figure 1:
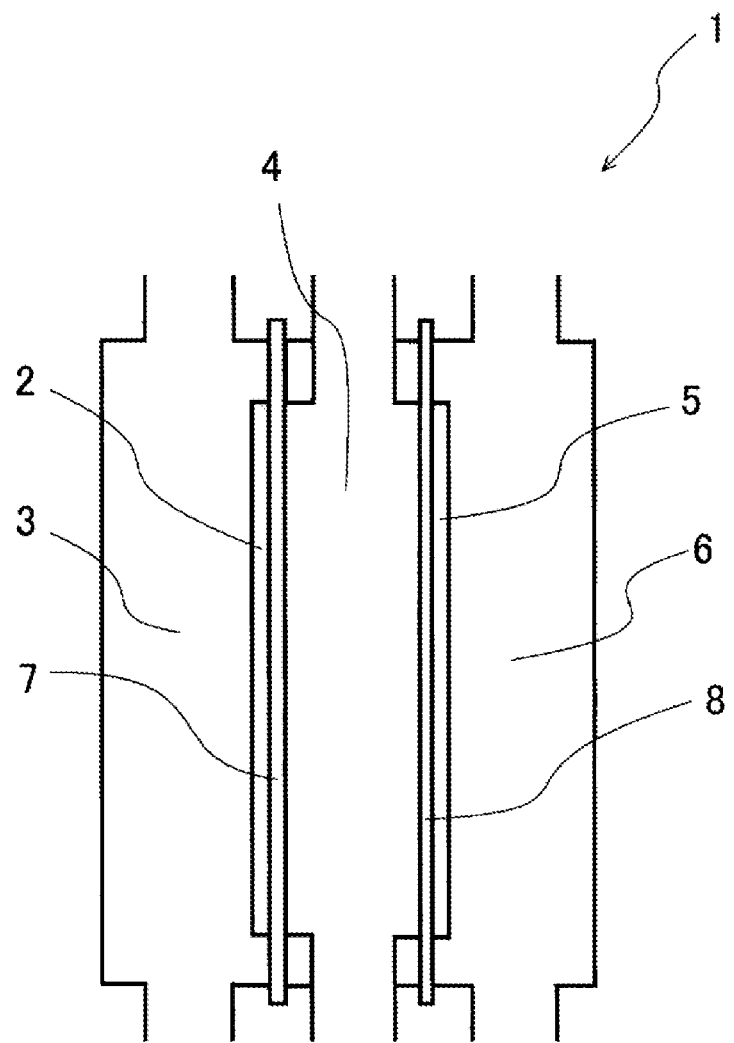
FIG. 1 is a schematic cross-sectional view of an electrolyzer.

Embodiments of the chamber frame element, the electrolyzer, and the electrodialysis cell according to the present invention will now be described referring to the drawings. In the following descriptions, a chamber frame element used for an intermediate chamber of a three-chamber electrolyzer is described as a representative example of the chamber frame element of the present invention, and a three-chamber electrolyzer is described as a representative example of the electrolyzer of the present invention; however, the chamber frame element of the present invention is not limited to be used for an intermediate chamber of a three-chamber electrolyzer, and can be used in the same manner also for an anode chamber and a cathode chamber of a two-chamber electrolyzer, as well as an electrolysis chamber of a single-chamber electrolyzer. Further, the electrolyzer of the present invention is not limited to be a three-chamber electrolyzer, and can be a two-chamber or single-chamber electrolyzer in which the chamber frame element of the present invention is used. Moreover, the chamber frame element of the present invention is not limited to be used in an electrolyzer, and can be used in an electrodialysis cell.

FIG. 1 is a schematic cross-sectional view of a three-chamber electrolyzer 1 in which a chamber frame element according to one embodiment of the present invention is used. In FIG. 1, the three-chamber electrolyzer 1 includes: an anode chamber 3 in which an anode 2 is housed; an intermediate chamber 4; and a cathode chamber 6 in which a cathode 5 is housed. The anode chamber 3 and the intermediate chamber 4 are separated by an anion exchange membrane 7 in an anion-permeable manner. The intermediate chamber 4 and the cathode chamber 5 are separated by a cation exchange membrane 8 in a cation-permeable manner.

Describing one example of electrolysis using the three-chamber electrolyzer 1 for the case of sodium sulfate, when an aqueous sodium sulfate solution as an electrolyte solution is introduced to the intermediate chamber 4 and electric power is supplied between the anode 2 and the cathode 5 to perform electrolysis, sulfate ions pass through the anion exchange membrane 7 and move to the anode chamber 3, while sodium ions pass through the cation exchange membrane 8 and move to the cathode chamber 6. The thus diluted aqueous solution is discharged from the intermediate chamber 4.

Figure 2:
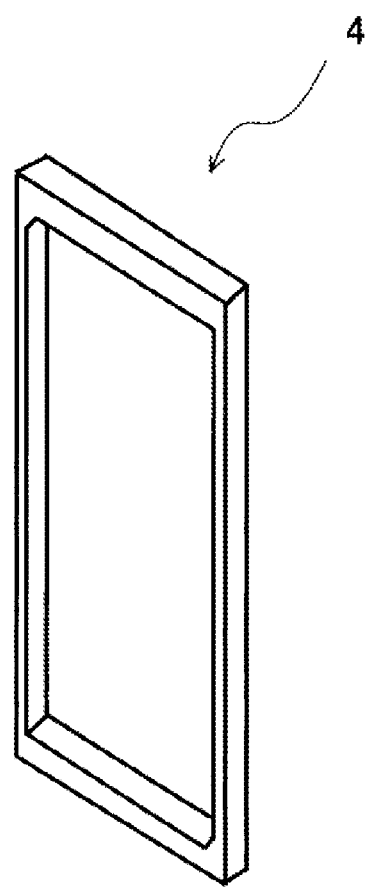
FIG. 2 is a schematic perspective view of a chamber frame element.

FIG. 2 shows a perspective view of main parts of the chamber frame element 4 that constitute an intermediate chamber for such a three-chamber electrolyzer as shown in FIG. 1. The chamber frame element 4 of FIG. 2 has a frame shape with an opening in the central part. As for the thickness of the chamber frame element 4, the chamber frame element 4 has a thickness that is required for attachment of piping used for connecting the chamber frame element 4 with a manifold. It is noted here that the piping to be attached and the manifold are omitted in FIG. 2. The chamber frame element 4 is made of a resin, whereby corrosion caused by a leakage current, which is problematic for conventional metal-made chamber frame elements, can be inhibited.

Nevertheless, with the chamber frame element 4 in which the material of a conventional metal-made chamber frame element is simply changed to a resin without changing the shape, the thickness of an intermediate chamber stays the same, and a voltage drop during electrolysis is thus not inhibited relative to the prior art. In this respect, a chamber frame element 14 according to one embodiment of the present invention, with which the thickness of an intermediate chamber can be reduced, is shown in FIGS. 3A and 3B as a plane view (FIG. 3A) and a side view (FIG. 3B).

The chamber frame element 14 of FIGS. 3A and 3B includes: a bag body 141 having an interior space; a frame 142 housed in the bag body 141; and an inlet 143 and an outlet 144 formed on the bag body 141.

The bag body 141 is made of, for example, resin films, and has a substantially rectangular planar shape in the illustrated example. The bag body 141 is formed by superimposing two resin films and sealing the circumference of these films in a bag shape with an adhesive or a heat seal. Instead of preparing two resin films, a single resin film may be folded and overlaid, and the circumference of this film except the folded part may be sealed to form a bag. As the resin film, any resin film that is not corroded by an electrolyte solution can be selected and, for example, a film of a polyethylene, a polyester (e.g., PET), a polypropylene, or a common plastic such as PTFE, PFA, or PVC, can be used.

In the central part of each of the two resin films constituting the bag body 141, an opening 141a for allowing ion exchange membranes to face each other as diaphragms is formed. In the illustrated present embodiment, on the outer side of the portion of the bag body 141 in which the above-described frame is housed, the inlet 143 is formed in the vicinity of one longitudinal end of the bag body 141, and the outlet 144 is formed in the vicinity of the other end.

More specifically, in the present embodiment shown in FIGS. 3A and 3B, the bag body 141 has a protruding part 141b and a protruding part 141c, which have a substantially triangular planar shape, on the respective longitudinal ends, and thus has a hexagonal planar shape rather than a substantially rectangular planar shape as a whole. The inlet 143 is formed on the protruding part 141b, while the outlet 144 is formed on the protruding part 141c. As a result, an electrolyte solution introduced into the bag body 141 via the inlet 143 flows in such a manner to spread in the width direction toward the base of the triangular protruding part 141b at one longitudinal end of the bag body 141, so that good fluidity is attained and the electrolyte solution can smoothly flow in the frame 142. In addition, the electrolyte solution directed from the frame 142 toward the outlet 144 in the bag body 141 flows from the base of the triangular protruding part 141c to the outlet 144 in a converging manner, so that good fluidity is attained and the electrolyte solution can smoothly flow to the outlet 144. It is noted here that the protruding parts 141b and 141c of the bag body 141 are not indispensable, and the shape of each longitudinal end of the bag body 141 is not restricted as long as an electrolyte solution can smoothly flow in the bag body 141. Embodiments without the protruding parts 141b and 141c will be described later.

The inlet 143 has a structure through which an electrolyte solution can be introduced into the bag body 14. The outlet 144 has a structure through which the electrolyte solution in the bag body 141 can be discharged. In the example shown in FIGS. 3A and 3B, the inlet 143 and the outlet 144 are formed by making holes on a single resin film. A nozzle 145 is attached to each of the inlet 143 and the outlet 144, and resin-made piping is connected to the nozzle 145. In the example shown in FIGS. 3A and 3B, the inlet 143 and the outlet 144 are each arranged singly; however, the inlet 143 or the outlet 144 may be arranged in a plural number.

The electrolyte solution introduced via the inlet 143 into the bag body 141 flows toward the opening 141a. In the case of the three-chamber electrolyzer shown in FIG. 1, the electrolyte solution is ion-exchanged in the opening 141a by the anion exchange membrane 7 and the cation exchange membrane 8, and the thus ion-exchanged electrolyte solution flows toward the outlet 144.

In order to ensure a flow rate necessary for such a series of electrolysis processes, the chamber frame element 14 is required to have an electrolyte solution flow path formed in the bag body 141. Accordingly, in the chamber frame element 14 of the present embodiment, the frame 142 is arranged in the interior space of the bag body 141. The frame 142 is made of a resin. As the resin of the frame 142, any resin that is not corroded by an electrolyte solution can be selected and, for example, a polyethylene, a polyester (e.g., PET), a polypropylene, a polyvinyl chloride, a polystyrene, a polyurethane, or a common plastic such as PTFE, PFA, or PVC, can be used.

The planar shape and the size of the opening of the frame 142 are substantially the same as those of the opening 141a of the bag body 141. The opening of the frame 142 and the opening 141a of the bag body 141 are aligned at the same position and adhered with each other using an adhesive or the like. The frame 142 is provided with a groove or a channel communicating from the outside to the inside of the frame, or the frame 142 is porous, allowing an electrolyte solution to flow from the inside to the outside of the frame 142 and vice versa. In the chamber frame element of the present embodiment that is shown in FIGS. 3A and 3B, grooves 142a communicating to both the outside and the inside of the frame 142 are formed on the surface of the frame 142. In the illustrated present embodiment, the grooves 142a are formed on each of a total of two sides among the four sides of the frame 142, which are the side facing the inlet 143 and the side facing the outlet 144. The positions, the size, and the number of the grooves are not limited to the ones shown in FIGS. 3A and 3B.

In the chamber frame element 14 of the present embodiment, the thickness of the frame 142 may be as small as possible as long as a sufficient flow rate of an electrolyte solution can be ensured. Accordingly, the thickness of the frame 142 can be reduced to a required minimum as much as possible. The amount of voltage drop during electrolysis is determined by a total thickness of the frame 142 and the resin film of the bag body 141; therefore, in the chamber frame element 14 of the present embodiment, a voltage drop can be inhibited by the frame 142 whose thickness is reduced to a required minimum as much as possible.

Further, in the chamber frame element 14, an electrolyte solution is introduced and discharged via the piping connected to the inlet 143 and the outlet 144, respectively; therefore, even in an electrolyzer having a structure in which plural unit cells are arranged, the piping connected to the respective unit cells may be assembled together, so that it is not necessary to arrange a manifold inside the chamber frame element 14. Accordingly, a flow path penetrating through all elements is not required as in the case of an intermediate chamber in which a manifold is arranged, and this not only simplifies the unit cell structure and makes the production cost inexpensive, but also enables to reduce the bypass current and thus reduce the consumption of reactive power.

Moreover, the chamber frame element 14 has a simple basic structure constituted by two members, which are the bag body 141 and the frame 142, and can be easily produced by pasting together these members by press molding; therefore, the chamber frame element 14 can be easily mass-produced, and the production cost can also be reduced in this respect. The size of the chamber frame element 14 can be easily increased as well. Furthermore, in the chamber frame element 14, since the bag body 141 and the frame 142 are made of a resin, corrosion caused by a leakage current, which is problematic for conventional metal-made chamber frame elements, can be inhibited.

FIGS. 4A and 4B show illustrative drawings of a chamber frame element 24 according to another embodiment. The chamber frame element 24 of FIGS. 4A and 4B includes: a bag body 241 having an interior space; a frame 242 housed in the bag body 241; and an inlet 243 and an outlet 244 formed on the bag body 241. A nozzle 245 is attached to each of the inlet 243 and the outlet 244. An opening 241a is formed on the bag body 241, and grooves 242a are formed on the frame 242.

The chamber frame element 24 shown in FIGS. 4A and 4B is made of a resin, and has a basic structure similar to that of the chamber frame element 14 shown in FIGS. 3A and 3B. A difference is that the bag body 241 has a rectangular planar shape. That is, while the bag body 141 of the chamber frame element 14 shown in FIGS. 3A and 3B has the protruding parts 141b and 141c, the bag body 241 of the chamber frame element 24 of this embodiment shown in FIGS. 4A and 4B does not have a protruding part. The frame 242, the inlet 243, and the outlet 244 of the chamber frame element 24 shown in FIGS. 4A and 4B have the same configurations as the frame 142, the inlet 143, and the outlet 144 of the chamber frame element 14 shown in FIGS. 3A and 3B, respectively; therefore, descriptions redundant to the above are omitted.

The chamber frame element 24 shown in FIGS. 4A and 4B has the same effects as the chamber frame element 14 shown in FIGS. 3A and 3B. That is, in the chamber frame element 24, a voltage drop can be inhibited by the frame 242 whose thickness is reduced to a required minimum, and an electrolyte solution is introduced and discharged via the piping connected to the inlet 243 and the outlet 244, respectively; therefore, as opposed to an intermediate chamber in which a manifold is arranged, a flow path penetrating through all elements is not required, and this not only simplifies the unit cell structure and makes the production cost inexpensive, but also enables to reduce the bypass current and thus reduce the consumption of reactive power. Further, the chamber frame element 24 has a simple basic structure constituted by two members, which are the bag body 241 and the frame 242, and can be easily produced by pasting together these members by press molding; therefore, the chamber frame element 24 can be easily mass-produced, and the production cost can also be reduced in this respect. The size of the chamber frame element 24 can be easily increased as well. Moreover, in the chamber frame element 24, since the bag body 241 and the frame 242 are made of a resin, corrosion caused by a leakage current, which is problematic for conventional metal-made chamber frame elements, can be inhibited.

Figure 5:
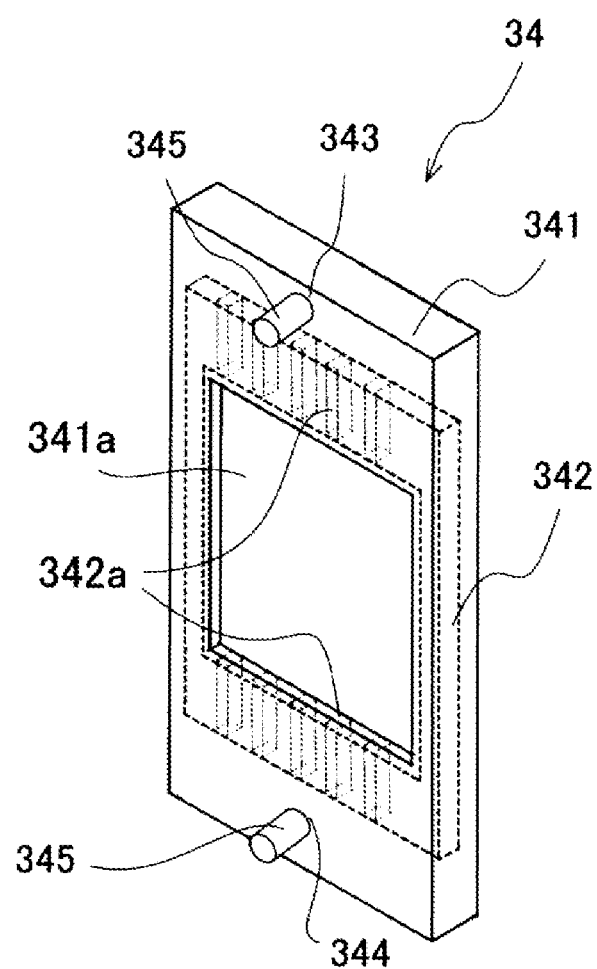
FIG. 5 is a perspective view of a chamber frame element according to yet another embodiment.

FIG. 5 shows a perspective view of a chamber frame element 34 according to yet another embodiment. The chamber frame element 34 of FIG. 5 includes: a bag body 341 having an interior space; a frame 342 housed in the bag body 341; and an inlet 343 and an outlet 344 formed on the bag body 341. A nozzle 345 is attached to each of the inlet 343 and the outlet 344. An opening 341a is formed on the bag body 341, and grooves 342a are formed on the frame 342.

The chamber frame element 34 shown in FIG. 5 is made of a resin, and has a basic structure similar to that of the chamber frame element 14 shown in FIGS. 3A and 3B. A difference is that the bag body 341 has a substantially cuboid box shape. The frame 342, the inlet 343, and the outlet 344 of the chamber frame element 34 shown in FIG. 5 have the same configurations as the frame 142, the inlet 143, and the outlet 144 of the chamber frame element 14 shown in FIGS. 3A and 3B, respectively; therefore, descriptions redundant to the above are omitted.

The chamber frame element 34 is made of a resin, and has the same actions and effects as the chamber frame element 14 shown in FIGS. 3A and 3B. That is, in the chamber frame element 34, a voltage drop can be inhibited by the frame 342 whose thickness is reduced to a required minimum, and an electrolyte solution is introduced and discharged via the piping connected to the inlet 343 and the outlet 344, respectively; therefore, as opposed to an intermediate chamber in which a manifold is arranged, a flow path penetrating through all elements is not required, and this not only simplifies the unit cell structure and makes the production cost inexpensive, but also enables to reduce the bypass current and thus reduce the consumption of reactive power. Further, the chamber frame element 34 has a simple basic structure constituted by two members, which are the bag body 341 and the frame 342, and can be easily produced by pasting together these members by press molding; therefore, the chamber frame element 34 can be easily mass-produced, and the production cost can also be reduced in this respect. The size of the chamber frame element 34 can be easily increased as well. Moreover, in the chamber frame element 34, since the bag body 341 and the frame 342 are made of a resin, corrosion caused by a leakage current, which is problematic for conventional metal-made chamber frame elements, can be inhibited.

Figure 3:
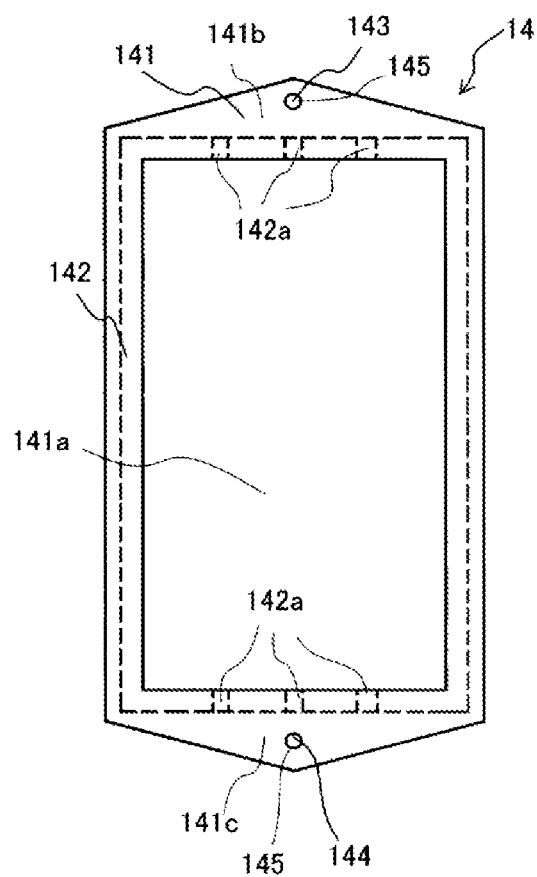
FIG. 3A is an illustrative drawing of a front view of a chamber frame element according to the present embodiment.
FIG. 3B is an illustrative drawing of a side view of a chamber frame element according to the present embodiment.
Figure 3:
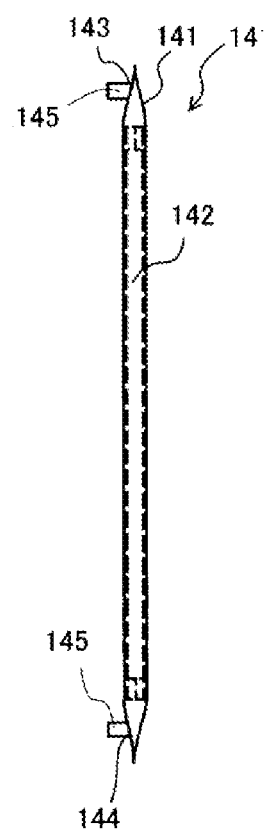
Figure 4:
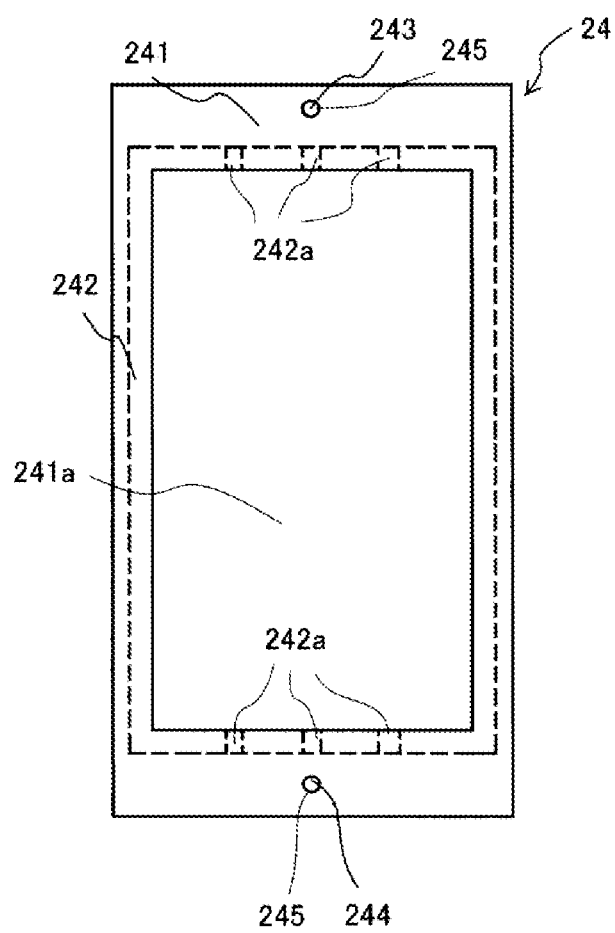
FIG. 4A is an illustrative drawing of a front view of a chamber frame element according to another embodiment.
FIG. 4B is an illustrative drawing of a side view of a chamber frame element according to another embodiment.
Figure 4:
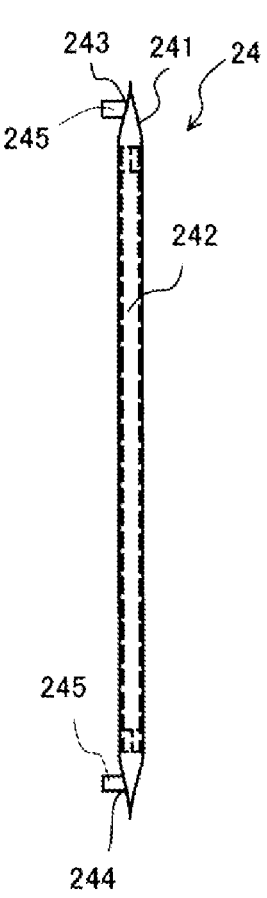

As understood from FIGS. 3 to 5, the bag body can take various shapes.

One example of a method of producing a chamber frame element will now be described for the case of the chamber frame element 34 shown in FIG. 5, referring to FIGS. 6A to 6D.

Figure 6:
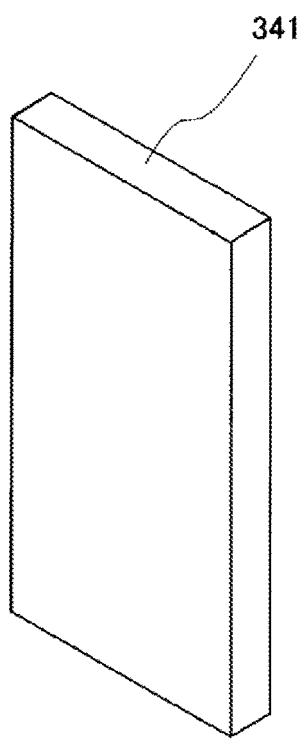
FIG. 6A is a perspective view illustrating one example of a production process of a chamber frame element.
FIG. 6B is a perspective view illustrating one example of a production process of a chamber frame element.
FIG. 6C is a perspective view illustrating one example of a production process of a chamber frame element.
FIG. 6D is a perspective view illustrating one example of a production process of a chamber frame element.
Figure 6:
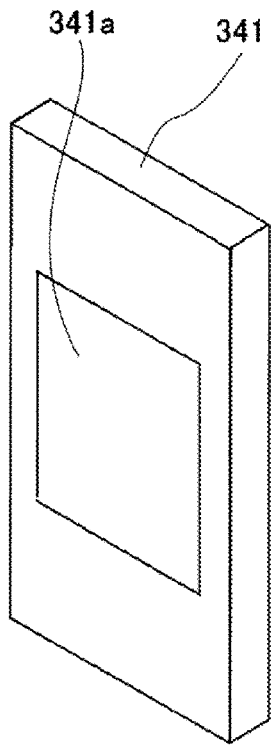
Figure 6:
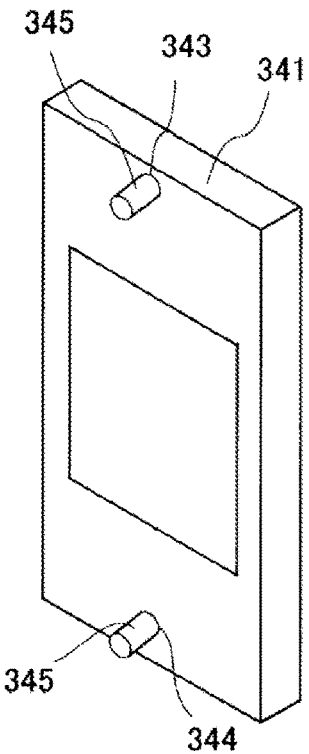
Figure 6:
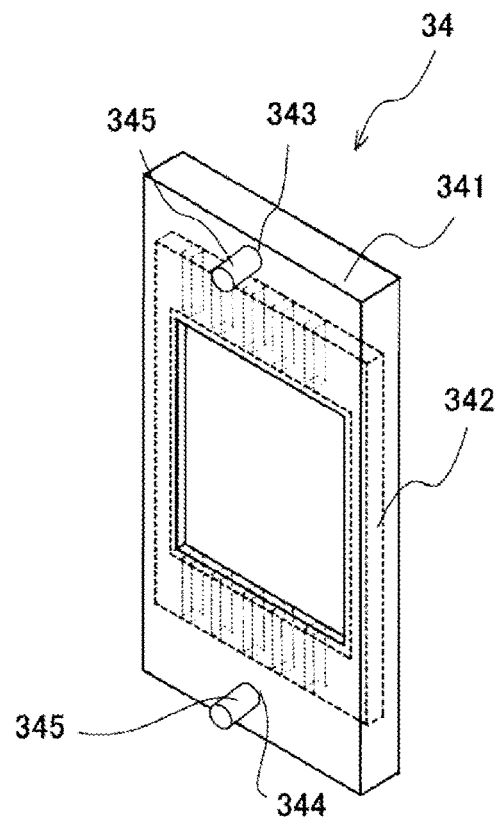

As shown in FIG. 6A, the bag body 341 is produced from a resin film. As a method and an apparatus for the production of the bag body 341, any known method and apparatus can be employed. At least one surface of the bag body 341 is made openable such that the frame 342 can be later inserted into the interior space of the bag body 341.

Next, as shown in FIG. 6B, the opening 341a for application of an electric current is formed on both of the opposing surfaces of the bag body 341.

Subsequently, as shown in FIG. 6C, the inlet 343 and the outlet 344 are formed on the bag body 341, and the nozzle 345 is attached to each of the inlet 343 and the outlet 344. It is noted here that the formation of the opening 341a shown in FIG. 6B and the formation of the inlet 343 and the outlet 344 may be carried out in any order, and the formation of the inlet 343 and the outlet 344 may be carried out before the formation of the opening 341a.

Thereafter, as shown in FIG. 6D, the frame 342 is inserted into and adhered with the bag body 341, and the outer periphery of the bag body 341 is sealed with an adhesive or a heat seal.

Thus far, the chamber frame element of the present invention has been described referring to the drawings; however, the above descriptions and drawings are merely examples, and the present invention should not be interpreted as being limited thereto by any means. Embodiments with various modifications in design and the like are also included in the scope of the present invention as long as the actions and effects described in the respective embodiments can be exerted. For instance, a bipolar electrode may be used in the three-chamber electrolyzer. Further, embodiments in which the chamber frame element of the present invention is used in an electrolyzer have been described above; however, the chamber frame element of the present invention may also be used in an electrodialysis cell.

DESCRIPTION OF SYMBOLS

1: three-chamber electrolyzer
2: anode
3: anode chamber

4: intermediate chamber (chamber frame element)
5: cathode
6: cathode chamber
7: anion exchange membrane
8: cation exchange membrane
14, 24, 34: chamber frame element
141, 241, 341: bag body
142, 242, 342: frame
143, 243, 343: inlet
144, 244, 344: outlet
145, 245, 345: nozzle

The invention claimed is:

1. A chamber frame element for an electrolyzer or an electrodialysis cell, the chamber frame element comprising:
    a bag body;
    a frame housed in an interior space of the bag body; and
    an inlet and an outlet to which piping can be attached, the inlet and the outlet being formed on the outer side of a region where the frame is housed in the bag body.

2. The chamber frame element according to claim 1, wherein the chamber frame element is made of a resin.

3. The chamber frame element according to claim 1, wherein the frame comprises a flow path that allows a liquid inflowing from the inlet to flow inside the frame and a liquid inside the frame to flow to the outlet.

4. The chamber frame element according to claim 3, wherein the flow path is a groove or a channel that communicates to the outside and the inside of the frame, or the frame is formed of a porous material.

5. The chamber frame element according to claim 1, wherein the chamber frame element is for a three-chamber electrolyzer.

6. An electrolyzer comprising the chamber frame element according to claim 1.

7. An electrodialysis cell comprising the chamber frame element according to claim 1.

8. An electrolyzer comprising the chamber frame element according to claim 2.

9. An electrolyzer comprising the chamber frame element according to claim 3.

10. An electrolyzer comprising the chamber frame element according to claim 4.

11. An electrolyzer comprising the chamber frame element according to claim 5.

12. An electrodialysis cell comprising the chamber frame element according to claim 2.

13. An electrodialysis cell comprising the chamber frame element according to claim 3.

14. An electrodialysis cell comprising the chamber frame element according to claim 4.

15. An electrodialysis cell comprising the chamber frame element according to claim 5.

* * * * *